United States Patent
Deguchi et al.

(10) Patent No.: US 11,256,585 B2
(45) Date of Patent: Feb. 22, 2022

(54) STORAGE SYSTEM

(71) Applicant: Hitachi, Ltd., Tokyo (JP)

(72) Inventors: Yoshiaki Deguchi, Tokyo (JP); Naoya Okada, Tokyo (JP); Ryosuke Tatsumi, Tokyo (JP); Kentaro Shimada, Tokyo (JP); Sadahiro Sugimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 12 days.

(21) Appl. No.: 16/821,562

(22) Filed: Mar. 17, 2020

(65) Prior Publication Data

US 2021/0034482 A1 Feb. 4, 2021

(30) Foreign Application Priority Data

Aug. 1, 2019 (JP) .............................. JP2019-142117

(51) Int. Cl.
*G06F 11/00* (2006.01)
*G06F 11/20* (2006.01)
(Continued)

(52) U.S. Cl.
CPC ............ *G06F 11/2069* (2013.01); *G06F 1/24* (2013.01); *G06F 9/4403* (2013.01);
(Continued)

(58) Field of Classification Search
CPC ............... G06F 11/2069; G06F 11/076; G06F 11/3034; G06F 11/2053; G06F 11/2071; G06F 11/2084; G06F 11/2089; G06F 11/2092; G06F 1/24; G06F 9/4403; G06F 9/5011; G06F 9/544; G06F 12/0607; G06F 12/0873; G06F 12/0238; G06F 11/2056;
(Continued)

(56) References Cited

U.S. PATENT DOCUMENTS

2002/0133740 A1* 9/2002 Oldfield .................... H04L 1/22
714/6.12
2005/0246508 A1* 11/2005 Shaw .................. G06F 12/0607
711/157
(Continued)

FOREIGN PATENT DOCUMENTS

JP 2016-189140 A 11/2016
JP 2016-207121 A 12/2016

*Primary Examiner* — Anthony J Amoroso
(74) *Attorney, Agent, or Firm* — Procopio, Cory, Hargreaves & Savitch LLP

(57) ABSTRACT

A storage system includes a first storage controller including a plurality of main storage media and one or more processor cores, and a second storage controller including a plurality of main storage media and one or more processor cores and performing communication with the first storage controller. Storage areas of the main storage media in the first storage controller are allocated to an address map. In response to the occurrence of failures in one or mode main storage media of the main storage media of the first storage controller, the first storage controller performs restarting to reallocate the storage areas of the main storage media excluding one or more main storage media having caused the failures to an address map reduced than before the occurrence of the failures. The second storage controller continues operating during the restarting of the first storage controller.

10 Claims, 14 Drawing Sheets

(51) Int. Cl.
  *G06F 11/07*    (2006.01)
  *G06F 11/30*    (2006.01)
  *G06F 9/4401*   (2018.01)
  *G06F 1/24*     (2006.01)
  *G06F 9/54*     (2006.01)
  *G06F 12/06*    (2006.01)
  *G06F 12/0873*  (2016.01)
  *G06F 9/50*     (2006.01)

(52) U.S. Cl.
  CPC ............ *G06F 9/5011* (2013.01); *G06F 9/544* (2013.01); *G06F 11/076* (2013.01); *G06F 11/3034* (2013.01); *G06F 12/0607* (2013.01); *G06F 12/0873* (2013.01)

(58) Field of Classification Search
  CPC ............... G06F 11/2094; G06F 9/4411; G06F 2212/312; G06F 2212/225; G06F 2212/7204; G06F 2212/1032; G06F 2212/7201
  See application file for complete search history.

(56) References Cited

U.S. PATENT DOCUMENTS

| | | | | |
|---|---|---|---|---|
| 2012/0102268 A1* | 4/2012 | Smith | ................... | G06F 12/084 |
| | | | | 711/113 |
| 2016/0321139 A1 | 11/2016 | Kitamoto et al. | | |
| 2017/0116097 A1* | 4/2017 | Keremane | ........... | G06F 11/0757 |
| 2020/0117533 A1* | 4/2020 | Nijhawan | ............ | G11C 29/886 |

* cited by examiner

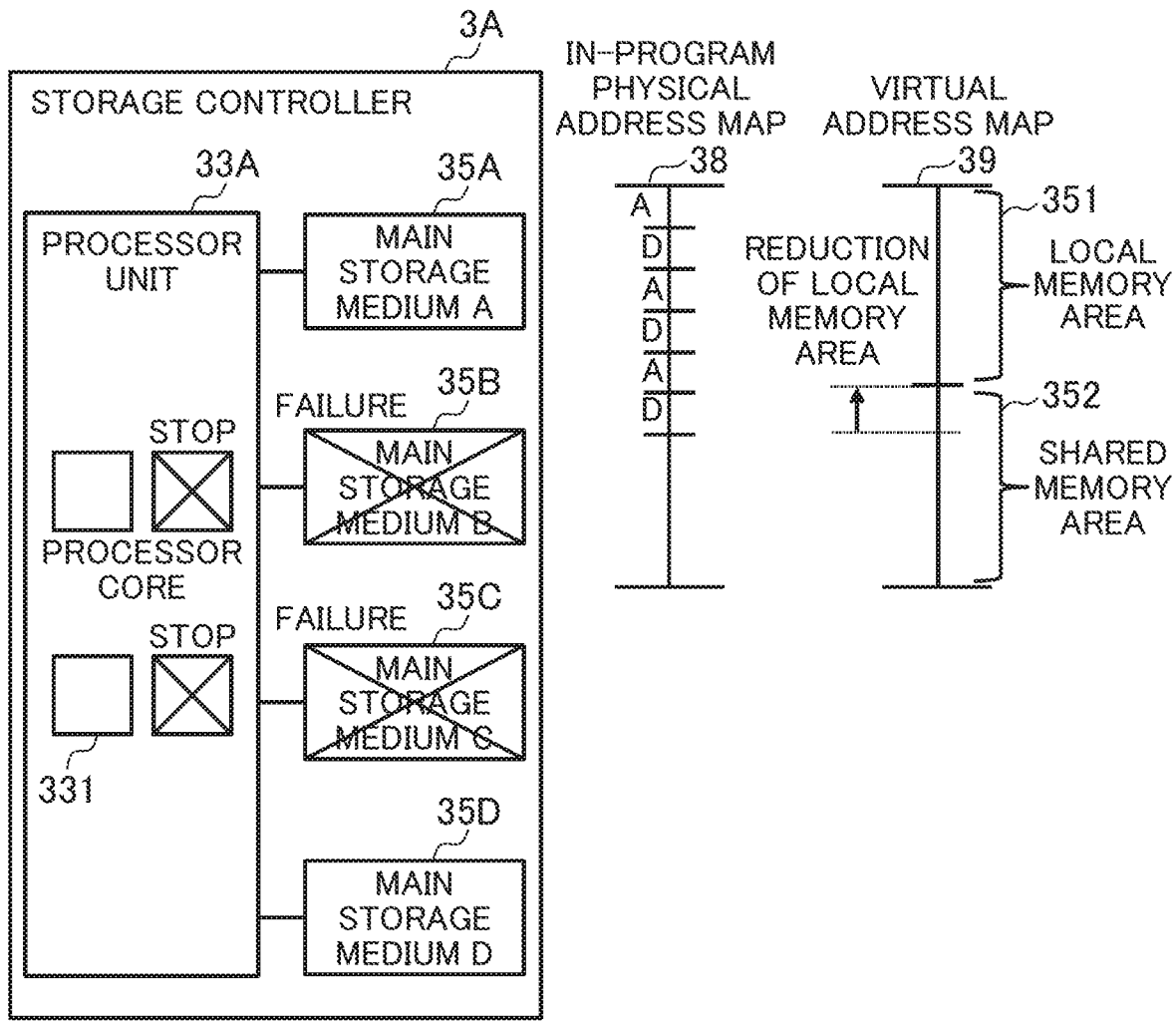

VIRTUAL ADDRESS MAP TABLE

BOOTABLE PROCESSOR CORE NUMBER STORAGE TABLE

| NUMBER OF BOOTABLE PROCESSOR CORES | REQUIRED MEMORY SIZE |
|---|---|
| 20 | 0x25000000 |
| 19 | 0x24800000 |
| 18 | 0x24000000 |
| 17 | 0x23800000 |
| ... | ... |

REQUIRED MEMORY SIZE STORAGE TABLE

| IN-MEDIUM PHYSICAL MEMORY ADDRESS | FAILURE CONFIRMATION FLAG |
|---|---|
| 0x00000000-0x00FFFFFF | FAILURE OCCURRENCE |
| 0x01000000-0x01FFFFFF | FAILURE OCCURRENCE |
| 0x02000000-0x02FFFFFF | NO FAILURE |
| 0x03000000-0x03FFFFFF | NO FAILURE |
|  |  |

FAILURE OCCURRED AREA STORAGE TABLE

STORAGE SYSTEM

CLAIM OF PRIORITY

The present application claims priority from Japanese patent application JP 2019-142117 filed on Aug. 1, 2019, the content of which is hereby incorporated by reference into this application.

BACKGROUND

The present disclosure relates to a storage system.

In a computer system like a storage system, processing is often performed in parallel to enhance calculation processing performance. In such a case, when a failure has occurred during the parallel processing, the corresponding processing is transferred to another computer, where it is capable of attempting to recover from the failure. There has been described in, for example, Japanese Unexamined Patent Application Publication No. 2016-207121 (Patent Document 1), "an electronic apparatus and a reboot program are provided which are capable of appropriately restarting processing during work even if reboot processing is performed for failure restoration". In the case of this technique, when a failure occurs in a part of independent processing being executed in parallel, the corresponding processing is transferred to another computer, where the corresponding apparatus is restarted.

However, in terms of processing of a typical multicontroller storage system, a resource such as a main storage medium is shared with other controllers, and restarting the corresponding apparatus makes it harder to restore its processing. For that reason, it is generally necessary to bring the corresponding controller to a blocked state, or switch it to a preliminary system until a failure portion is physically exchanged.

There has been described in Japanese Unexamined Patent Application Publication No. 2016-189140 (Patent Document 2), "according to one aspect of the present invention, a management apparatus characterized by having a storage system configuration part of reconfiguring a storage system having redundancy by a storage device incorporating part of incorporating a preliminary storage device connected to the storage system through a communication line into the storage system where a failure causing disable access to any of a plurality of storage devices configuring the storage system has occurred, the storage device having caused no failure, and the incorporated preliminary storage device". In the case of this technique, the storage system is caused to have a preliminary storage controller in advance, and the storage controller is replaced therewith at the time of the failure occurrence.

SUMMARY

When a failure occurs in a main storage medium in a multicontroller storage system, and a controller is blocked, it is necessary for a maintenance person to manually perform its restoration. For that reason, the time taken from the failure occurrence to the restoration becomes long, and the reliability and availability of the system are degraded. Further, when the system is reconfigured by using the preliminary storage controller as in Japanese Unexamined Patent Application Publication No. 2016-189140 (Patent Document 2), components are increased because of securing of its redundancy.

A storage system of one aspect of the present disclosure is provided which has a first storage controller including a plurality of main storage media and one or more processor cores, and a second storage controller including a plurality of main storage media and one or more processor cores and performing communication with the first storage controller. Storage areas of the main storage media of the first storage controller are allocated to an address map. In response to the occurrence of failures in one or more main storage media of the main storage media of the first storage controller, the first storage controller performs restarting to reallocate the storage areas of the main storage media excluding the one or more main storage media having caused the failures to an address map reduced than before the occurrence of the failures. The second storage controller continues operating during the restarting of the first storage controller.

According to one aspect of the present disclosure, it is possible to enhance the reliability and availability of the system.

BRIEF DESCRIPTION OF THE DRAWINGS

FIG. 7 shows an example of address maps when failures occur in plural main storage media and some of processor cores are stopped;

FIG. 8 shows a configuration example of a virtual-physical translation table;

FIG. 11 shows a configuration example of a required memory size storage table;

FIG. 12 shows a configuration example of a failure occurred area storage table;

DETAILED DESCRIPTION

Figure 1:
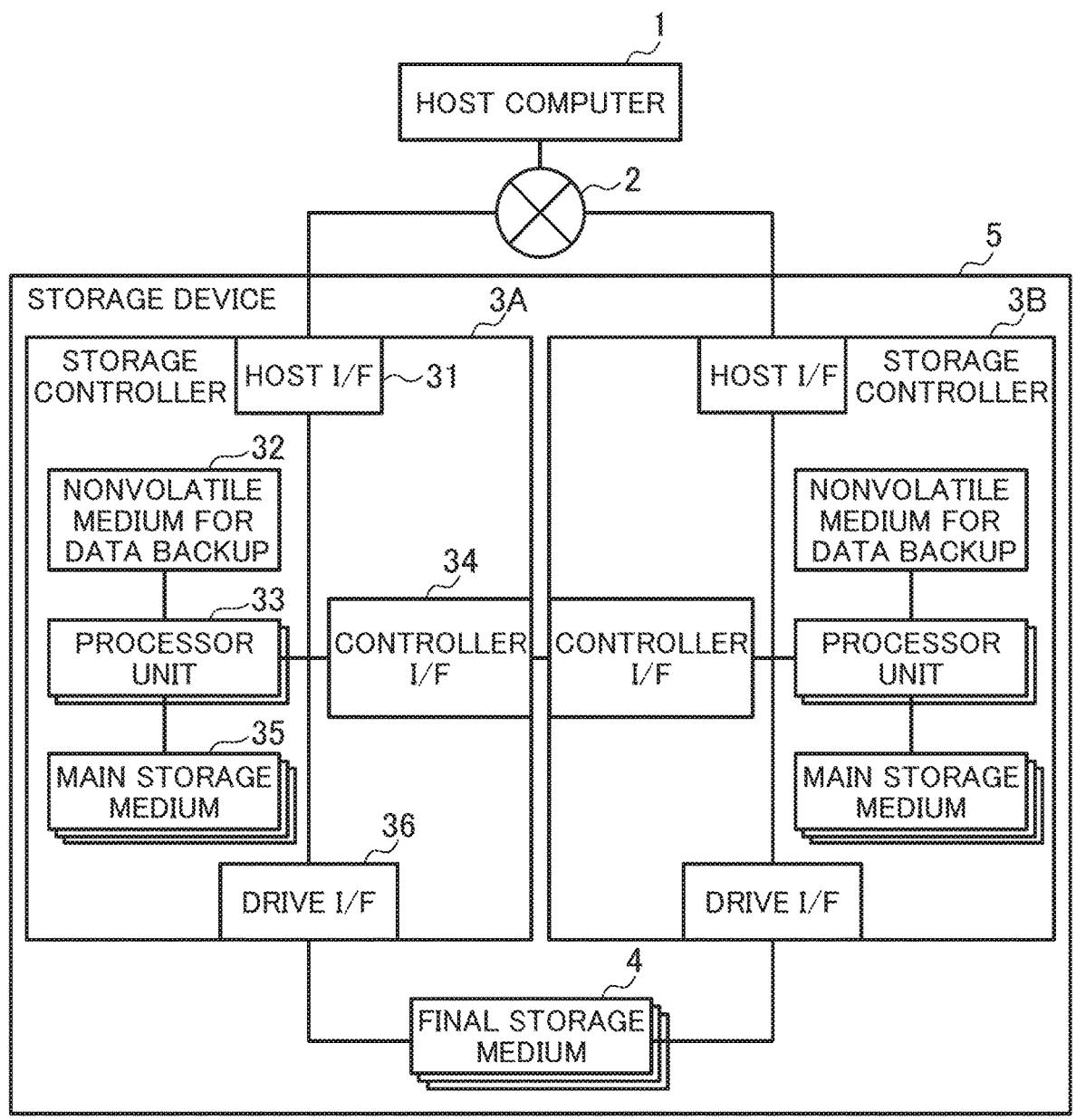
FIG. 1 shows a system configuration example of a first embodiment.

Embodiments of the present disclosure will hereinafter be described with reference to the accompanying drawings. In the following description, a "controller" refers to a storage controller. A "multicontroller" refers to at least two or more storage controllers. When an own controller is referred to as viewed from a certain controller, it is called an "own controller". When a controller other than the own controller is referred to, it is called "other controller". A "node" refers to a storage device having one or more controllers. The combination of two or more nodes is called a "multi-node". A storage system includes one or more nodes or storage devices.

In the following description, a "computer system" is a system including one or more physical computers. The physical computer may be a general-purpose computer or a dedicated computer. The physical computer may function as a computer (e.g., a host computer) which issues an I/O (Input/Output) request, or may function as a computer (e.g., a storage device) which performs I/O of data in response to the I/O request.

That is, the computer system may be at least one of a host system constituted of one or more host computers each of which issues an I/O request, and a storage system constituted of one or more storage devices each of which performs I/O of data in response to the I/O request. In at least one physical computer, one or more virtual computers (e.g., VM (Virtual Machine)) may be executed. The virtual computer may be a computer which issues an I/O request, or may be a computer which performs I/O of data in response to the I/O request.

In the following description, there may be a case in which processing is described with a "program" as a subject. However, the program is executed by a processor core to perform predetermined processing while using a storage unit and/or an interface unit or the like as appropriate. The subject of the processing may be defined as a processor unit (or a device like a controller having the processor unit).

The program may be installed in a device like a computer from a program source. The program source may be, for example, a program distribution server or a (e.g., non-transitory) recording medium readable by a computer. Further, in the following description, two or more programs may be executed as one program, or one program may be executed as two or more programs.

In the following description, information by which an output is obtained with respect to an input may be described by an expression like an "xxx table", but such information may be data of any structure, or may be a learning model like a neural network which generates an output for an input. Also, in the following description, the configuration of each table is an example, and one table may be divided into two or more tables, or all or part of two or more tables may be one table. Further, in the following description, identification numbers are used as identification information for various objects, but identification information (e.g., identifiers including English letters and codes) of kinds other than the identification numbers can also be adopted.

Embodiments to be described below generally relate to failure restoration of a main storage medium of a storage system including a multicontroller. The multicontroller storage system to be described below is capable of improving reliability and availability against the failure of the main storage medium.

For example, the storage system restarts the storage controller including the main storage medium except for a main storage medium having caused a failure. A storage area of the main storage medium excluding the main storage medium having caused the failure is reallocated to an address map (address space) by restarting. Other storage controllers continue the operation (processing of an I/O request from a host) during the restarting of the storage controller having caused the failure.

For example, the storage system preferentially stores data necessary for system control including a program to control the storage system and data shared with another storage controller among data stored in each main storage medium into the main storage medium of the restarted storage controller. In contrast, the storage system preferentially deletes temporarily-stored user data which affects little the reliability and availability to restore the storage controller.

When a failure point of the main storage medium is large, a memory area storing a control program and shared data therein runs short, and the reliability and availability are impaired, the storage system reduces, for example, the number of processor cores operated within the corresponding storage controller and performs reconfiguration of the storage controller. Consequently, it is possible to reduce a memory area necessary for a control program to be executed by a processor core. When the failure point of the main storage medium is large, and the memory area storing the control program and the shared data therein cannot be ensured, the storage system blocks, for example, the corresponding storage controller.

As described above, the storage system is capable of automatically restoring the main storage medium from its failure without providing a preliminary main storage medium and a preliminary storage controller in advance, and avoiding substantial degradation in reliability and availability of the system.

First Embodiment

FIG. 1 shows an overall configuration of an example of a computer system. The computer system shown in FIG. 1 includes a host computer 1 and a storage device 5 including storage controllers 3A and 3B. The host computer 1 accesses the storage controllers 3A and 3B through a network 2.

Each controller includes one or more host interfaces (I/F) 31, one or more processor units 33, one or more nonvolatile media for data backup 32, a plurality of main storage media 35, one or more controller I/Fs 34, and one or more drive I/Fs 36. The host computer 1 is connected to the host I/F 31 through the network 2. The processor unit 33 processes a request from the host computer 1 and performs writing/reading of data in and from a final storage medium 4 through the drive I/F 36.

The processor unit 33 includes one or more processor cores. At least on processor core is typically a microprocessor like a CPU (Central Processing Unit), but may be another kind of processor core like a GPU (Graphics Processing Unit). At least one processor core may be a broad processor core like a hardware circuit (e.g., FPGA (Field-Programmable Gate Array) or an ASIC (Application Specific Integrated Circuit) which performs a part or all of processing.

The main storage medium 35 may be constituted of a volatile memory or a nonvolatile memory. The nonvolatile medium for data backup 32 indicates a storage medium capable of storing data at the time of restarting or a system stop. The nonvolatile medium for data backup 32 is typically constituted of a nonvolatile memory, but it is enough if it is capable of maintaining data at the time of shutting off of power supply to the storage controller. The nonvolatile medium for data backup 32 may be constituted of a volatile memory having a power supply different from that of the storage controller.

The controller I/F 34 is an interface which mediates communications between the storage controllers. The controller I/F 34 may be a switch which connects two or more storage controllers or may not be a switch. The controller I/F 34 may be an interface which connects between nodes in a multi-node without directly connecting the storage controllers.

The final storage medium 4 is typically constituted of a nonvolatile memory. The data written from the host computer 1 is finally stored in the final storage medium 4. The drive I/F 36 is an interface which connects the storage controller and the final storage medium 4. The drive I/F 36 may be connected to the final storage medium 4 through the switch or directly. In the multicontroller storage system, the final storage medium may be connected only to one controller or node or may be connected to all controllers.

Figure 2:
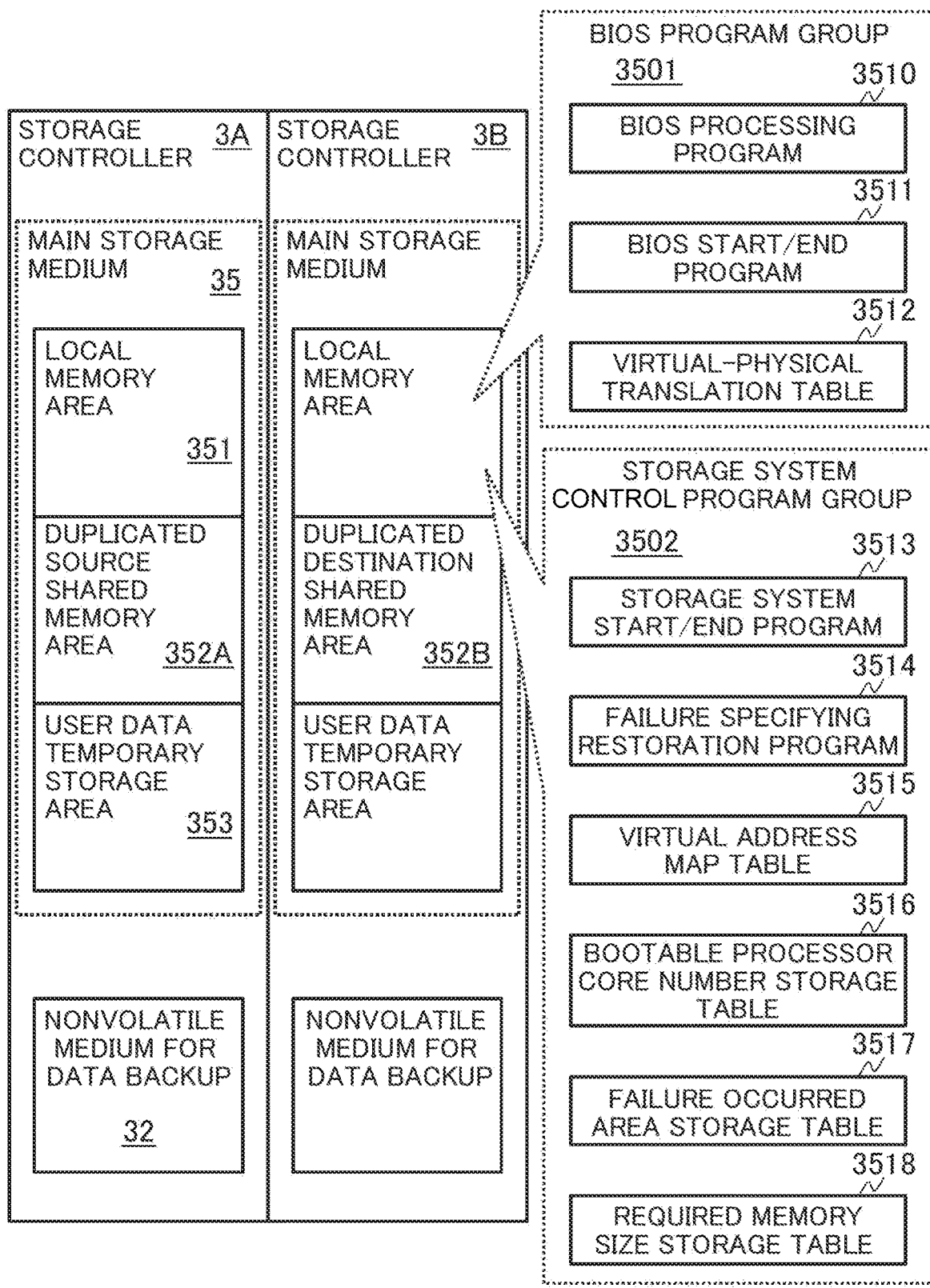
FIG. 2 shows an example of allocation areas of each main storage medium and data to be stored.

FIG. 2 shows an example of data stored in one main storage medium 35. The processor cores in the storage controllers 3A and 3B typically performs control of the storage system by using programs and tables stored in plural main storage media 35. Each of the main storage media 35 typically stores different types of data in three areas. The three areas are a local memory area 35, a shared memory area 352A/352B, and a user data temporary storage area 353. Incidentally, a part of the above three areas may be omitted in one main storage medium 35 if the three areas can be provided in the plural main storage media 35 as a whole.

The local memory area 351 is an area in the main storage medium accessed only by the processor core of the own controller. The local memory area 351 is an area for a program to be executed by the processor core of the own controller. The required size of the local memory area is also reduced if the number of processor cores operated within the own controller is reduced. At least part of the programs executed by the processor cores may be stored in another area.

The shared memory area 352A/352B is an area accessible even by the other controller in addition to the own controller. The data to be typically stored is data that a storage system control program should share between the controllers. In general, the data is duplicated to improve reliability and availability of the storage system.

The shared memory area 352A/352B is shared so as to be accessible from either of the storage controllers 3A an 3B. For example, a duplicated source shared memory area 352 is accessed during normal operation. The data stored in the duplicated source shared memory area 352A is stored even in the duplicated destination shared memory area 352B of the storage controller 3B in case where a failure has occurred in the main storage medium 35 of the storage controller 3A.

The user data temporary storage area 353 is also called a cache memory. Typically, the user data temporary storage area 353 is used to improve response performance to the host computer of the storage system. Reading/writing of data from/to the main storage medium 35 rather than direct reading/writing of data on the final storage medium 4 enables access to be accelerated. The storage controller is also capable of utilizing the user data temporary storage area 353 of the other controller. The presence or absence of existence of the user data temporary storage area 353 does not have direct influence on the reliability and availability of the storage system.

In the example of FIG. 2, the local memory area 351 stores a BIOS (Basic Input Output System) program group 3501 (part thereof) and a storage system control program group 3502 (part thereof) therein. The BIOS program group 3501 and/or the storage system control program group 3502 is a control program group. The storage system control program group 3502 is also called an operating system (OS). In the present example, data used by programs included in the program groups are also included in the program groups.

The BIOS program group 3501 includes a BIOS processing program 3510, a BIOS start/end program 3511, and a virtual-physical translation table 3512. The BIOS program group 3501 performs startup, control and end of hardware to execute the installed OS3502. The BIOS program group 3501 may be another name.

The storage system control program group 3502 controls the storage system. The storage system control program group 3502 includes a storage system start/end program 3513, a failure specifying restoration program 3514, a virtual address map table 3515, a bootable processor core number storage table 3516, a failure occurred area storage table 3517, and a required memory size storage table 3518.

The nonvolatile medium for data backup 32 temporarily stores data necessary when the storage system is stopped or restarted. In the same way even in stopping the storage controller due to the occurrence of a failure, for example, a failure occurred area storage table 3517 and a required memory size storage table 3518 necessary for the next startup are stored in the nonvolatile medium for data backup 32.

Incidentally, although not clearly shown in FIG. 2, as in the virtual address map, information held by the storage controller and to be shared by another storage controller is shared by communications between the controllers.

Figure 3:
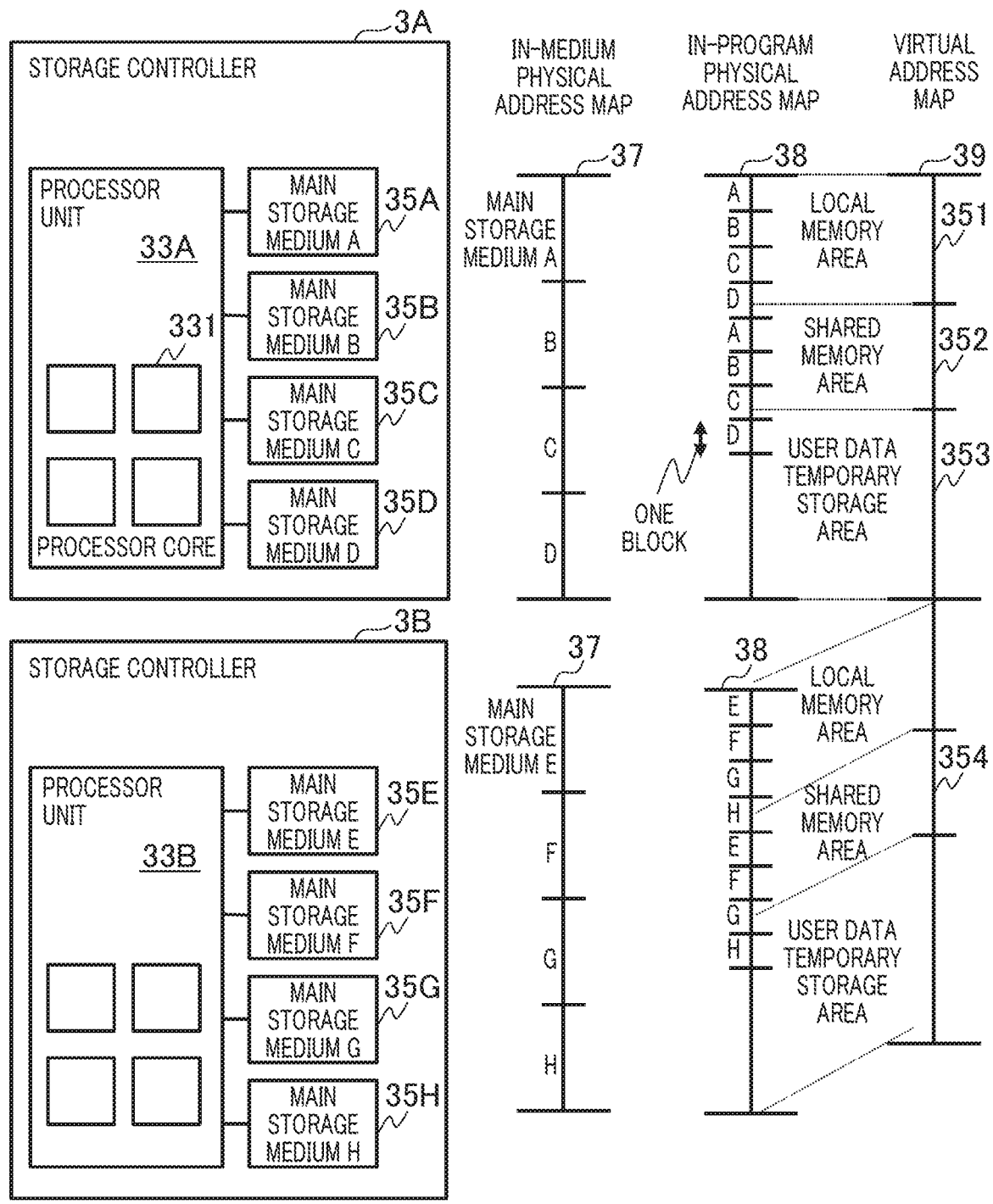
FIG. 3 shows an outline of each address map in a storage system.

FIG. 3 shows memory address maps of plural main storage media 35. A memory address is an address indicative of a data position in each main storage medium and may also be called simply an "address". In the example of FIG. 3, the storage controller 3A includes a main storage medium A35A, a main storage medium B35B, a main storage medium C35C, and a main storage medium D35D. The storage controller 3B includes a main storage medium E35E, a main storage medium F35F, a main storage medium G35G, and a main storage medium H35H. An arbitrary main storage medium is denoted by reference numeral 35 below.

The main storage media 35 of each storage controller have physical addresses. In FIG. 3, they are referred to as an in-medium physical address map (in-medium physical address space) 37. FIG. 3 shows an in-medium physical address map 37 of the main storage media 35A to 35D of the storage controller 3A, and an in-medium physical address map 37 of the main storage media 35E to 35H of the storage controller 3B.

The in-medium physical address map 37 is a memory address map of each main storage medium and indicates addresses in each main storage medium. The in-medium physical address map 37 is typically an address map of each main storage medium which is initially recognized by the BIOS program group 3501. On the other hand, there is known a main interleave (hereinafter described as interleave) as a method of improving the parallelism of I/O of the main storage media and enhancing throughput to the main storage media. When the storage system utilizes the main storage media, the main storage media are interleaved to attain high-speed data access.

Specifically, the storage system control program group 3502 uses an in-program physical address map (in-program physical address space) 38 in which the main storage media are allocated in block units in turn. FIG. 3 shows the respective in-program physical address maps 38 of the storage controllers 3A and 3B. The in-program physical address map 38 is a memory address map of each main storage medium which is recognized by the storage system control program group 3502. Typically, the BIOS processing program 3510 performs conversion between the in-medium physical address map 37 and the in-program physical address map 38. The in-program physical address map 38 may be omitted.

The block is the smallest unit at time of allocation of each in-program physical address map. One block generally ranges from 64 bytes to 128 bytes, but is not limited to this range. In the example of FIG. 3, the blocks of the main storage media 35 are allocated to the in-program physical address map 38 in a round-robin fashion. Another allocation method, e.g., straight mapping allowing addresses to correspond in 1 to 1 may be used.

Further, when the storage system control program group 3502 actually uses the in-program physical address map 38, a virtual address map (virtual address space) 39 is provided such that each address desired to be used is freely allocated. The virtual address map 39 is an address map used in association with the in-program physical address when the storage system control program uses the main storage medium.

In the virtual address map 39, address regions are respectively allocated to a local memory area 351, a shared memory area 352, and a user data temporary storage area 353. In the example of FIG. 3, the continuous addresses of the virtual address map 39 are allocated to the local memory area 351, the shared memory area 352, and the user data temporary storage area 353 respectively, but the order of the addresses allocated to the respective areas is optional.

In the example of FIG. 3, the virtual address map 39 referred to by the storage system control program group 3502 consecutively allocates addresses even to the address map of the main storage medium 35 in another controller in addition to the address map of the main storage medium 35 in the own controller. Thus, the multicontroller storage system is capable of sharing one virtual address map in its entirety. In another example, a plurality of virtual address maps may be used.

All the areas in the virtual address map 39 are not required to be associated with the in-program physical address map 38 or the in-medium physical address map 37. Addresses not used within the virtual address map 39 may exist therein. The virtual address map 39 may be omitted. Further, the values of addresses allocated from the virtual address map 39 to the in-program physical address map 38 may be either continuous or discontinuous.

Figure 4:
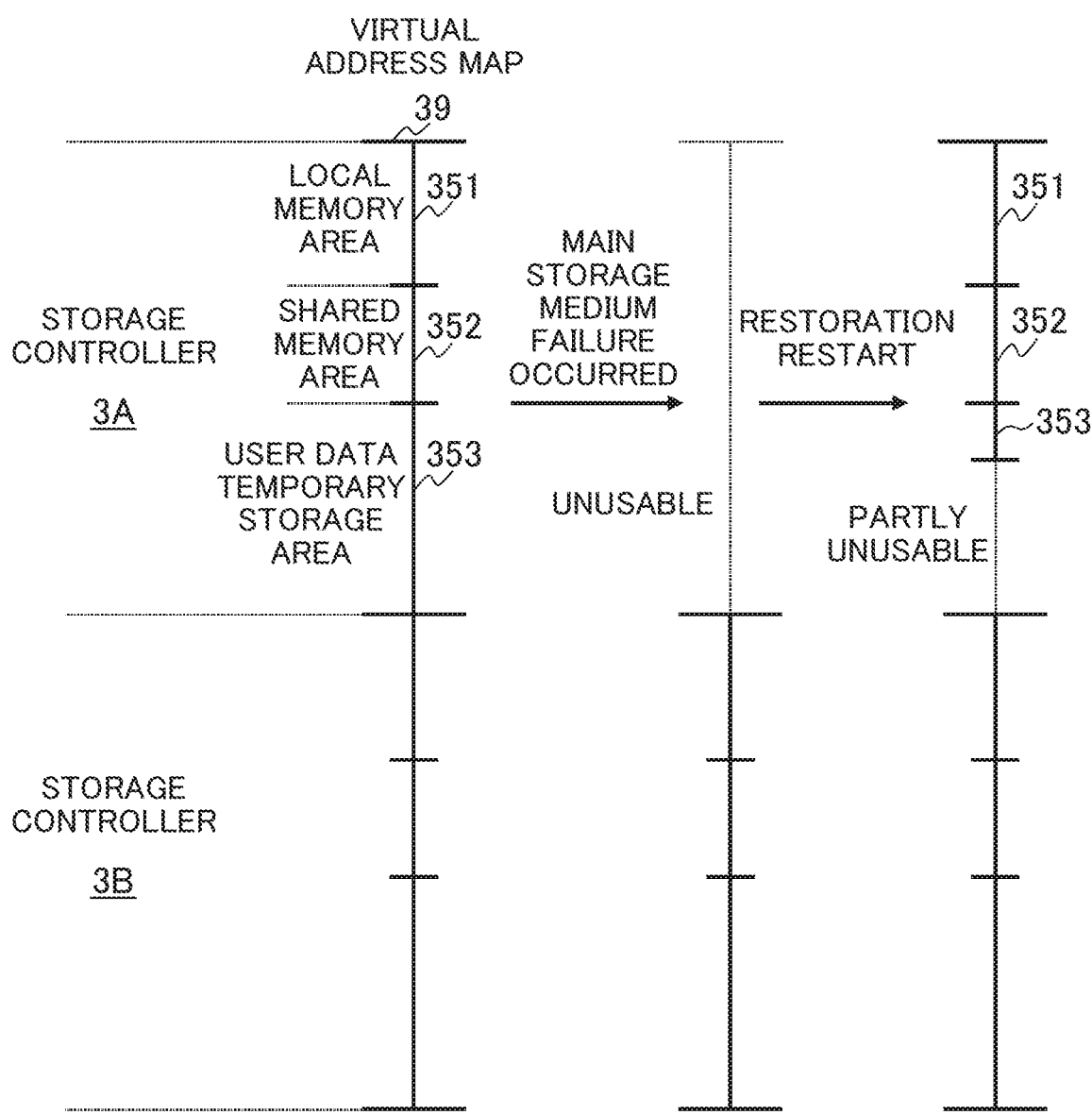
FIG. 4 shows an outline of virtual address map restoration at the occurrence of a failure.

FIG. 4 shows an outline of a restoring operation when a failure occurs in a part of the main storage medium. FIG. 4 shows the virtual address map 39. Assume that a failure has occurred in a part of the main storage medium 35 included in the storage controller 3A. Since the main storage medium 35 is used by interleaved, the failure of the partial main storage medium 35 leads to a failure in the entire in-program physical address map 38 of the storage controller 3A. For that reason, the storage system prohibits access from the own controller (storage controller 3A) and another controller to the addresses allocated to the storage controller 3A.

Thereafter, the storage system excludes only the main storage medium 35 having caused the failure from the main storage media 35 allocated to the virtual address map 39. The storage system eliminates the user data temporary storage area 353 of the storage controller 3A to restart the storage controller 3A. Since the user data temporary storage area 353 does not substantially affect the reliability and availability of the storage system, it is possible to avoid the reliability and availability due to the failure of the main storage medium.

The storage system preferentially reduces the user data temporary storage area 353. When the main storage area runs short even if the user data temporary storage area is reduced by a predetermined reducible amount, i.e., the user data temporary storage area 353 reaches a preset size (e.g., 0), the storage system decreases the number of processor cores (operating processor core number) executing the control program groups 3501 and 3502 to reduce the local memory area 351. The operating processor core number may be either 1 or more or 0. When the number of operating processor cores is 0, for example, the storage controller 3A performs only sharing of data in the shared memory area 352 or may be stopped.

The minimum number (threshold value) of the operating processor cores may be set in advance, or may be determined by either a user or a software designer. In order to set the minimum number, for example, a command relative to a control program may be used, or a physical switch (for example, a toggle switch) provided in a device casing or a dip switch on a device substrate may be used.

The minimum number may be stored in the required memory size storage table 3518 to be described later as the minimum number of bootable processor cores, or may be stored in another table. In addition to or instead of the reduction in the local memory area 351, the shared memory area 352 may be reduced, and the area to be reduced is not limited. When there is a margin in each storage area size, it is not necessary to reduce the user data temporary storage area 353 preferentially.

The availability can be enhanced by restarting the storage controller 3A as described above. When the local memory area 351 and the shared memory area 352 run short even if the number of operating processor cores is reduced, the storage system blocks the storage controller 3A. An operator performs hardware conversion of the main storage medium in the storage controller 3A. When the local memory area 351 runs short, and the shared memory area 352 is sufficient, the storage controller 3A may perform only sharing of data in the shared memory area 352.

Figure 5:
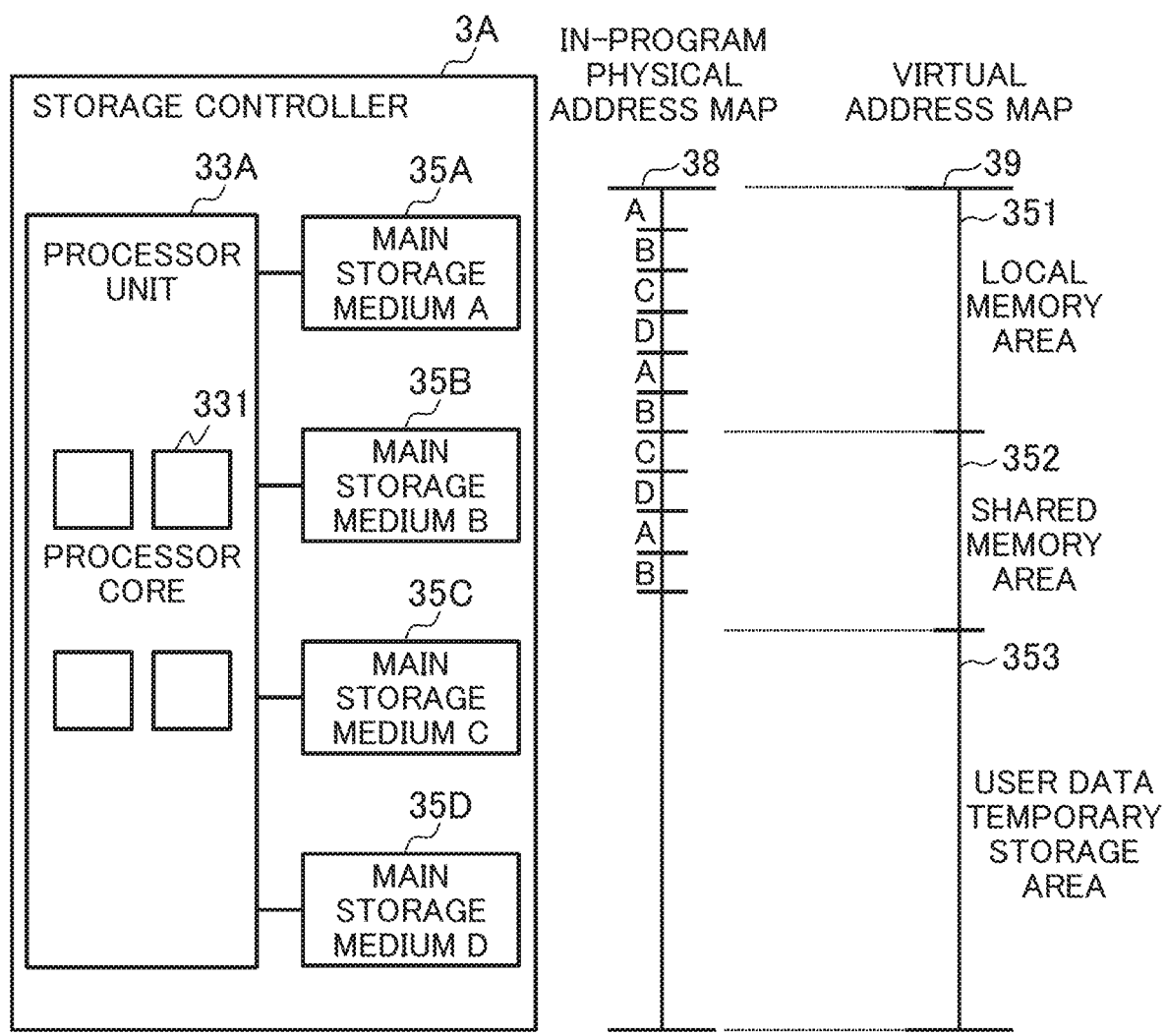
FIG. 5 shows an example of a processor unit and main storage media in a controller, and their address maps.
Figure 6:
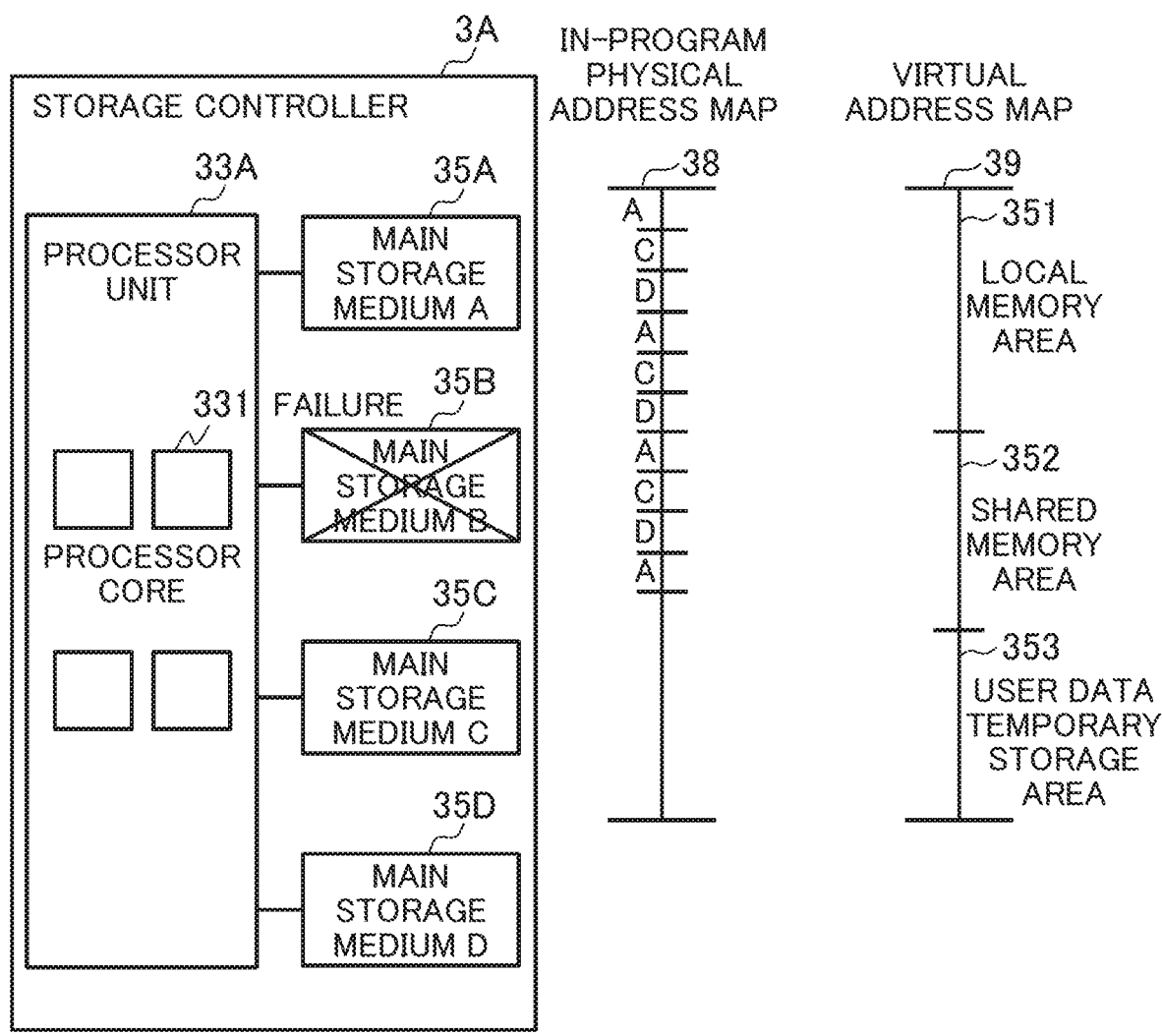
FIG. 6 shows an example of address maps when a failure occurs in one of the main storage media.

FIGS. 5, 6, and 7 respectively show an example of processing where a failure has occurred in the main storage medium 35. Typically, although a plurality of storage controllers are mounted in the storage system, one controller assuming that a failure occurs will be described here for ease of explanation. Further, in the present example, only one processor unit is mounted in one storage controller, but a plurality of processor units may be mounted in one controller.

FIG. 5 shows a configuration of the storage controller 3A and an example of the in-program physical address map 38 and the virtual address map 39. The storage controller 3A includes a processor unit 33A, and a main storage medium A35A, a main storage medium B35B, a main storage medium C35C, and a main storage medium D35D. In the present example, blocks (storage areas) of the main storage medium A35A, the main storage medium B35B, the main storage medium C35C, and the main storage medium D35D are allocated to the in-program physical address map 38 in a round-robin fashion. The virtual address map 39 defines a local memory area 351, a shared memory area 352, and a user data temporary storage area 353 which are continuous.

FIG. 6 shows a case where in the configuration example illustrated in FIG. 5, a failure has occurred in the main storage medium B35B. When the failure occurs in the main storage medium B35B, the storage controller 3A or another storage controller restarts the storage controller 3A. The in-program physical address map 38 after its restarting is updated depending on the failure of the main storage medium B35B.

In FIG. 6, there are shown in the in-program physical address map 38, addresses after the execution of the restarting after the failure has occurred. As shown in FIG. 5, before the occurrence of the failure, the blocks of the main storage medium A35A, the main storage medium B35B, the main storage medium C35C, and the main storage medium D35D have been allocated to the in-program physical address map 38.

After the restarting, as illustrated in FIG. 6, the blocks of the three main storage medium A35A, main storage medium C35C and main storage medium D35D excluding the main storage medium 35B are allocated to the in-program physical address map 38. Thus, the addresses of the main storage medium B35B having caused the failure do not exist in the in-program physical address map 38, and hence the program can be avoided from erroneously accessing a failure occurred location.

The capacity of the main storage medium in the storage controller 3A is reduced by 25%, by removing the main storage medium B35B. As shown in FIG. 6, the restarting is made possible by reducing the user data temporary storage area 353 without decreasing the sizes of the local memory area 351 and the shared memory area 352.

FIG. 7 shows a case where failures have occurred in the main storage medium B35B and the main storage medium C35C. After the failures have occurred in the two main storage media and the restarting is executed, the storage areas of the main storage medium A35A and the main storage medium D35D are reallocated to the in-program physical address map 38. The size of the in-program physical address map 38 becomes half as compared with its initial state before the occurrence of the failures.

The capacity of the main storage medium 35 is more reduced than in the example of FIG. 6. In the case of only the user data temporary storage area 353, its reduction amount runs short, and the local memory area 351 is required to be reduced. The storage system restarts the storage controller 3A in a state in which one or more of the processor cores of the processor unit 33 which has been operated in the storage controller 3A are stopped. Consequently, the local memory area 351 necessary for the operation of the processor cores can be reduced, and data of the required local memory area 351 and shared memory area 352 can be stored. It is thus possible to enhance the reliability and availability of the system.

FIG. 8 shows a configuration example of the virtual-physical translation table 3512. The virtual-physical translation table 3512 is created by the BIOS program group 3501 and used therein. The virtual-physical translation table 3512 is included in the BIOS program group 3501 and stored in the local memory area 351. The virtual-physical translation table 3512 has an in-medium physical address field 35121 and an in-program physical address field 35122. The virtual-physical translation table 3512 associates in-medium physical addresses and in-program physical addresses with one another. In the present example, one address space is defined with respect to a plurality of whole main storage media 35. In the example of FIG. 8, "0x" taken as the head of values means that values following it are hexadecimal.

Figure 9:
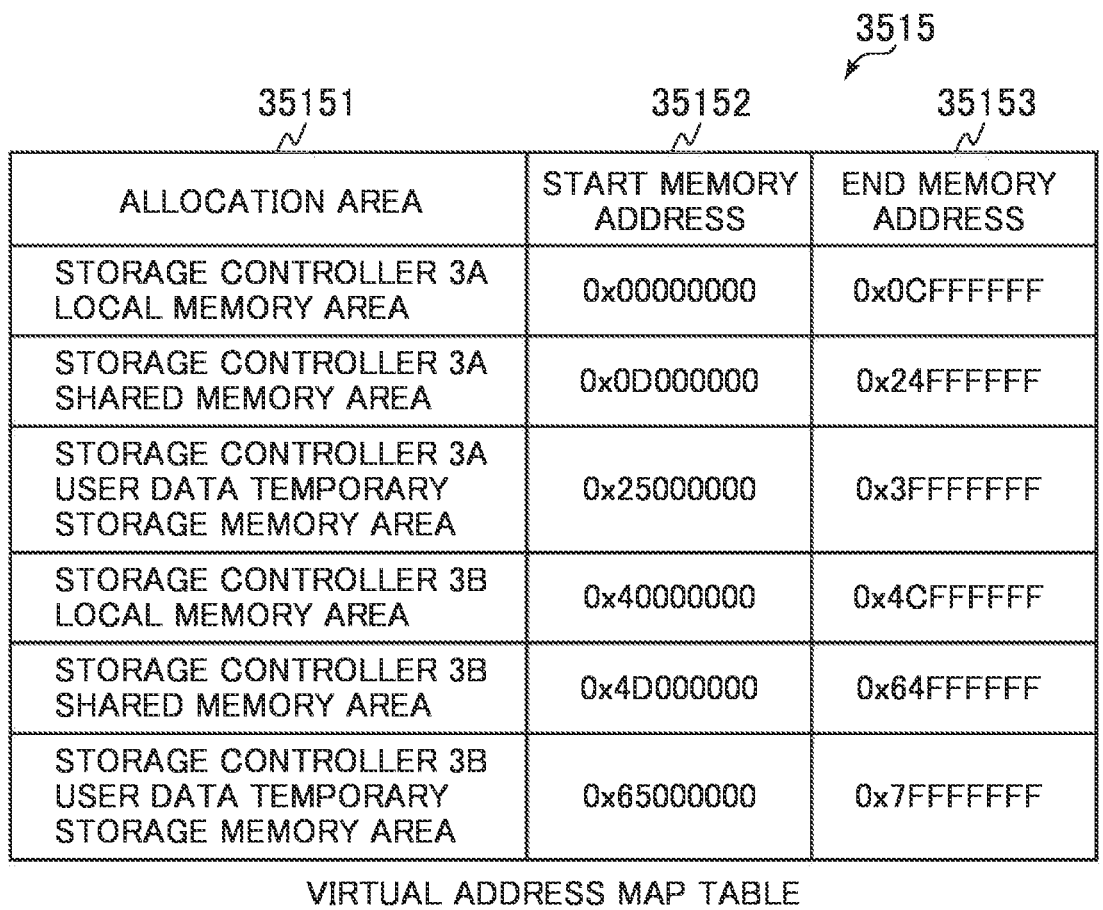
FIG. 9 shows a configuration example of a virtual address map table.

FIG. 9 shows a configuration example of the virtual address map table 3515. The virtual address map table 3515 is managed by the storage system start/end program 3513. The virtual address map table 3515 has an allocation area field 35151, a start memory address field 35152, and an end memory address field 35153.

The allocation area field 35151 indicates a local memory area, a shared memory area, and a user data temporary storage area as allocation areas. The start memory address field 35152 indicates a start address of each allocation area in the virtual address map 39. The end memory address field 35153 indicates an end address of each allocation area in the virtual address map 39. Each address shown in the allocation area field 35151 is a value obtained by adding an offset allocated to each controller to the in-program physical address in each storage controller. A method of classifying the allocation areas is not limited to this example. A method of indicating the range of each allocation area is not limited to the example of FIG. 9. The storage controller may hold a table of converting the in-medium physical address map to the virtual address map.

Figure 10:
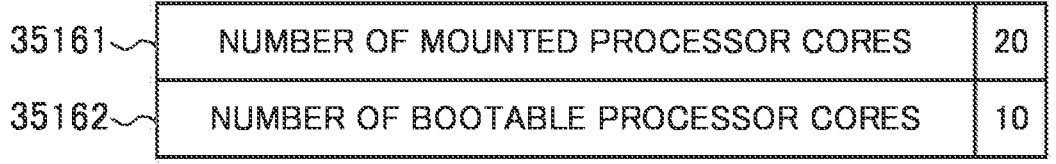
FIG. 10 shows a configuration example of a bootable processor core number storage table.

FIG. 10 illustrates a configuration example of the bootable processor core number storage table 3516. The bootable processor core number storage table 3516 is stored in the local memory area 351 during the normal operation and temporarily stored in the nonvolatile medium for data backup 32 at the time of restarting after the failure occurrence.

The bootable processor core number storage table 3516 has a mounted processor core number record 35161 and a bootable processor core number record 35162. The mounted processor core number record 35161 indicates the initially-mounted number of processor cores in the storage controller which stores the bootable processor core number storage table 3516 therein. The bootable processor core number record 35162 indicates the number of processor cores bootable at the time of restarting after the storage area of the main storage medium is reduced due to the failure occurrence.

FIG. 11 shows a configuration example of the required memory size storage table 3518. The required memory size storage table 3518 is stored in the storage controller in advance. The required memory size storage table 3518 has a bootable processor core number field 35181 and a required memory size field 35182.

The required memory size storage table 3518 indicates the sizes (capacities) of storage areas necessary for the respective bootable processor core numbers. In the example of FIG. 11, the required memory size field 35182 indicates the total size necessary for the local memory area 351 and the shared memory area 352. The size of the shared memory area 352 is fixed regardless of the number of processor cores, for example. With this in view, the sharing of information with the other storage controller can be more appropriately performed.

The bootable processor core number is determined based on the size of each remaining main storage medium 35 and the value of the required memory size field 35182 in the required memory size storage table 3518. In the example of FIG. 11, the bootable processor core number is 20 where the capacity of the main storage medium 35 exceeds 0x25000000. When the capacity of the main storage medium 35 is 0x25000000 or less and exceeds 0x24000000, the bootable processor core number becomes 18.

The size of the shared memory area 352 may change according to the number of processor cores. The required memory size field 35182 may indicate the necessary sizes of the respective local memory area 351 and shared memory area 352. The minimum number of bootable processor cores is set in advance. The restarting/restoration of the storage controller is determined to be possible when the bootable processor core number determined from the size of the main storage medium 35 is the minimum number or more.

FIG. 12 shows a configuration example of the failure occurred area storage table 3517. The failure occurred area storage table 3517 has an in-medium physical memory address field 35171 and a failure confirmation flag field 35172. The failure confirmation flag field 35172 indicates a failure occurred location corresponding to an in-medium physical memory address. The failure occurred area storage table 3517 is stored in the local memory area 351.

When a failure occurs in the main storage medium, the storage controller refers to the virtual address map table 3515 and the virtual-physical translation table 3512 stored in the local memory area 351 and updates a failure confirmation flag for the corresponding in-medium physical memory address in the failure occurred area storage table 3517.

Figure 13:
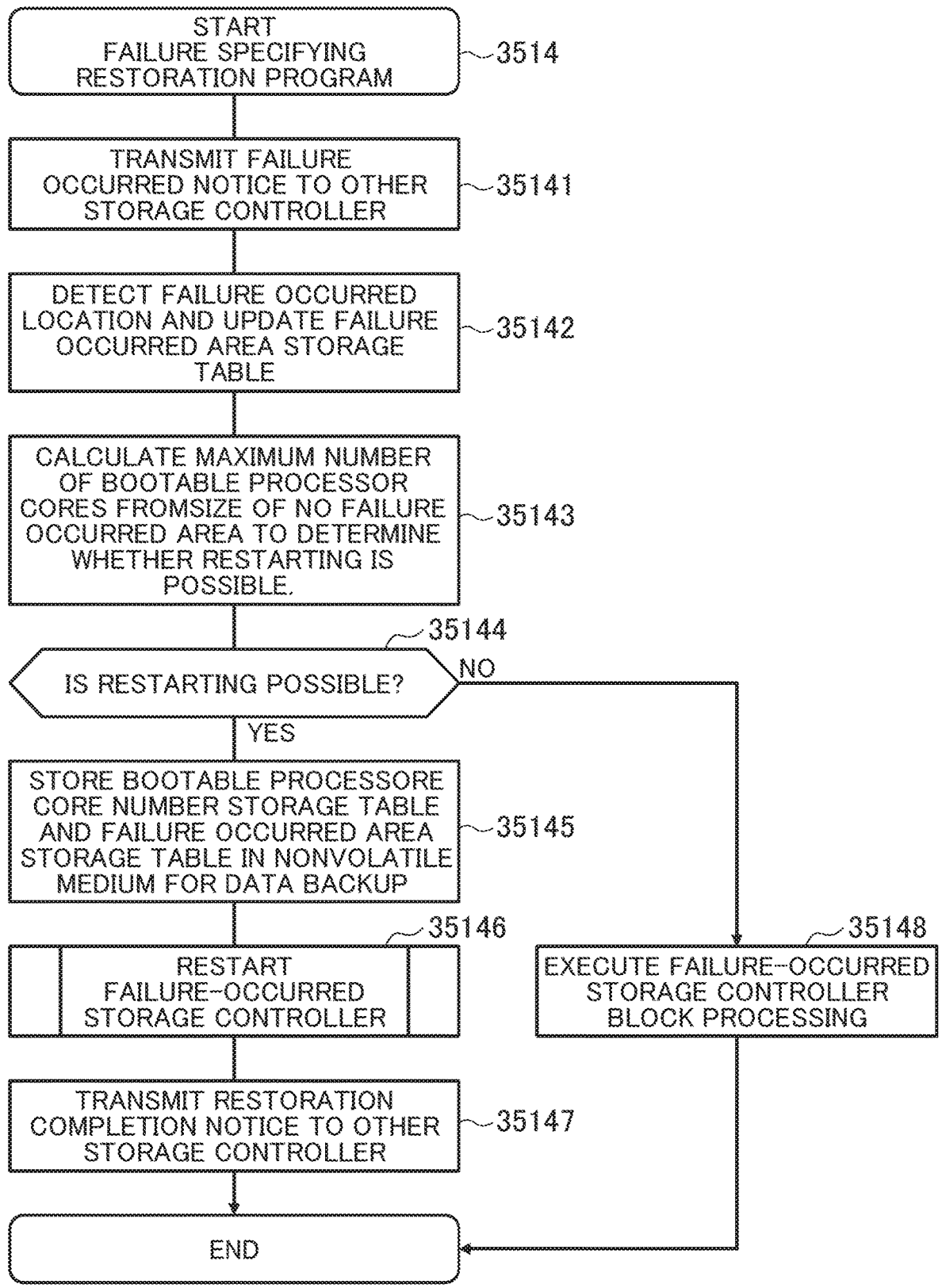
FIG. 13 shows the flow of a processing example of a failure specifying restoration program.

FIG. 13 shows the flow of processing of the failure specifying restoration program 3514. When it is detected that the failure has occurred in the main storage medium 35, the failure specifying restoration program 3514 starts its processing. In an example to be described below, the failure specifying restoration program 3514 is executed in the storage controller including the main storage medium 35 having caused the failure. In another example, the failure specifying restoration program 3514 may be executed in the other storage controller. The other storage controller holds therein information necessary to determine a configuration after the restarting of the failure-occurred storage controller, and delivers its configuration information at the time of restarting of the storage controller.

The failure specifying restoration program 3514 transmits a failure occurred notice indicative of a failure-occurred storage controller to the other storage controller uninformed of the occurrence of a failure (35141). This blocks access to the shared memory area 352 of the failure-occurred storage controller. Thereafter, the failure specifying restoration program 3514 detects a failure occurred location in the main storage medium 35 and updates a failure confirmation flag for the failure occurred area storage table 3517 (35142).

After updating of the failure occurred area storage table 3517, the failure specifying restoration program 3514 sums up the sizes of areas free of the occurrence of failures in the failure occurred area storage table 3517 to calculate the size of each no failure occurred area. The failure specifying restoration program 3514 refers to the required memory size storage table 3518 to determine the maximum number of bootable processor cores in which the calculated no failure occurred area size is the required memory size or more.

As described above, for example, a record of a value not greater than the no failure occurred area size and closest thereto among numerical values indicated by the required memory size field 35182 in the required memory size storage table 3518 indicates the maximum number of bootable processor cores. The failure specifying restoration program 3514 determines based on the maximum number of bootable processor cores whether restarting of the storage controller is possible (35143).

When the maximum number of bootable processor cores is smaller than the specified minimum number, i.e., when the calculated no failure occurred area size does not reach the size necessary for the minimum number of processor cores set in advance, the failure specifying restoration program 3514 determines that the restarting is not possible (35144: NO). The failure specifying restoration program 3514 executes block processing of the storage controller having caused the failure to stop the storage controller (35148). It is necessary for the operator to exchange the main storage medium having caused the failure.

When the no failure occurred area size satisfies the size necessary for the minimum number of processor cores set in advance, the failure specifying restoration program 3514 determines that the restarting is possible (35144: YES). The failure specifying restoration program 3514 updates the bootable processor core number storage table 3516. The failure specifying restoration program 3514 stores the bootable processor core number storage table 3516 and the failure occurred area storage table 3517 in the nonvolatile medium for data backup 32 (35145). Incidentally, other required information is also stored in the nonvolatile medium for data backup 32 in specific processing.

Thereafter, the failure specifying restoration program 3514 restarts the storage controller having caused the failure (35146). The details of the restarting will be described later with reference to FIG. 14. After the restarting, the failure specifying restoration program 3514 transmits a restoration completion notice to the other storage controller.

Figure 14:
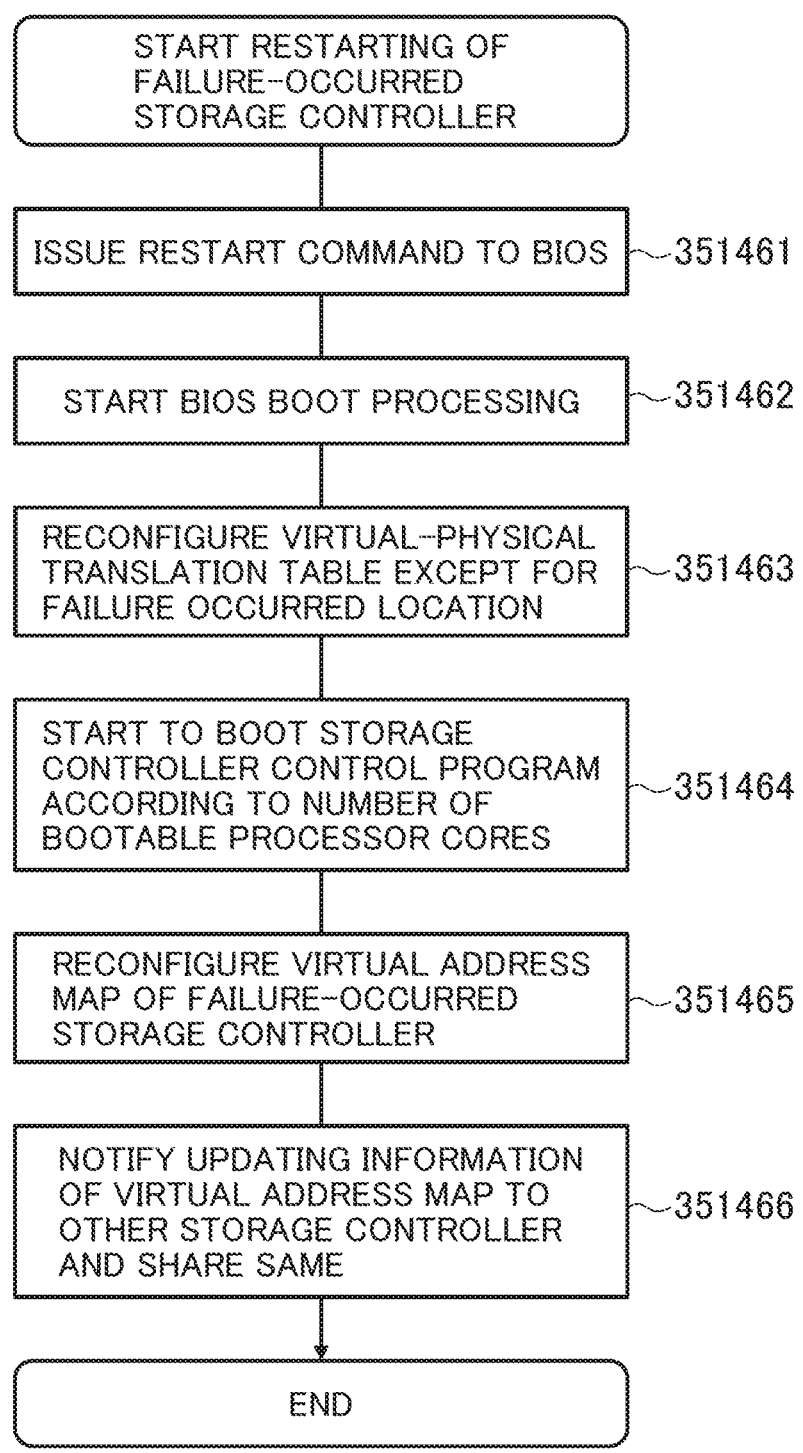
FIG. 14 shows the flow of restarting of a storage controller in which a failure has occurred.

FIG. 14 shows a detailed flow of the restarting (35146) for restoration of the storage controller having caused the failure. The failure specifying restoration program 3514 issues a restart command to the BIOS start/end program 3511 (351461). The BIOS start/end program 3511 starts restart processing (351462). Incidentally, the start of the BIOS start/end program 3511 may be instructed by another method.

The BIOS start/end program 3511 starts up the BIOS processing program 3510. The BIOS processing program 3510 refers to the failure occurred area storage table 3517 stored in the nonvolatile medium for data backup before the start of restarting, and reconfigures the virtual-physical translation table 3512 (351463). The BIOS processing program 3510 allocates an in-program physical address to an in-medium physical address except for each failure occurred location indicated by the failure occurred area storage table 3517. Consequently, the main storage medium having caused the failure is not used.

The BIOS processing program 3510 refers to the bootable processor core number storage table 3516 stored in the nonvolatile medium for data backup before the start of restarting. The BIOS processing program 3510 sets the bootable processor core number indicated by the bootable processor core number storage table 3516 to a register of the processor unit 33 and starts to boot the storage system control program group 3502 according to the bootable processor core number (351464). The storage system start/end program 3513 executes start processing of the storage system control program group 3502.

In the above example, the BIOS processing program 3510 sets the number of bootable processor cores at the time of startup of the storage system control program group 3502. In another example, the failure specifying restoration program 3514 may set the number of bootable processor cores to the register of the processor unit 33 at the time of startup of the BIOS program group 3501.

When the bootable processor core number is 0, the BIOS processing program 3510 may execute a simple control program of updating a shared memory to perform sharing of information with the other storage controller, which is different from the storage system control program group 3502. The processing of the I/O request from the host computer (host I/O processing) is stopped. Consequently, the shared memory area 352 is shared with the other controller, and degradation of the reliability and availability of the system can be suppressed. The minimum number of bootable processors (threshold value) as a condition to execute the simple control program of performing the information sharing may be larger than the minimum number of bootable processors (threshold value) as a condition to block the storage controller.

After Step 351464, the storage system start/end program 3513 reconfigures the virtual address map table 3515 of the storage controller having caused the failure (351465). The storage system start/end program 3513 refers to the required memory size storage table 3518 and determines the size of each memory area according to the bootable processor core number. The storage system start/end program 3513 determines the sizes of the local memory area 351 and the shared memory area 352 according to the required memory size storage table 3518 in terms of their sizes, and allocates the remaining memory areas to the user data temporary storage area 353.

After Step 351465, the storage system start/end program 3513 notifies information of the updated virtual address map table 3515 to the other storage controller and shares it (351466). Only information of a location changed within the virtual address map may be transmitted, or the whole virtual address map table 3515 may be transmitted.

According to the present embodiment as described above, when the failure occurs in the main storage medium in the multicontroller storage system, the storage controller is restarted in the proper configuration to suppress degradation of the reliability and availability of the system.

Second Embodiment

Figure 15:
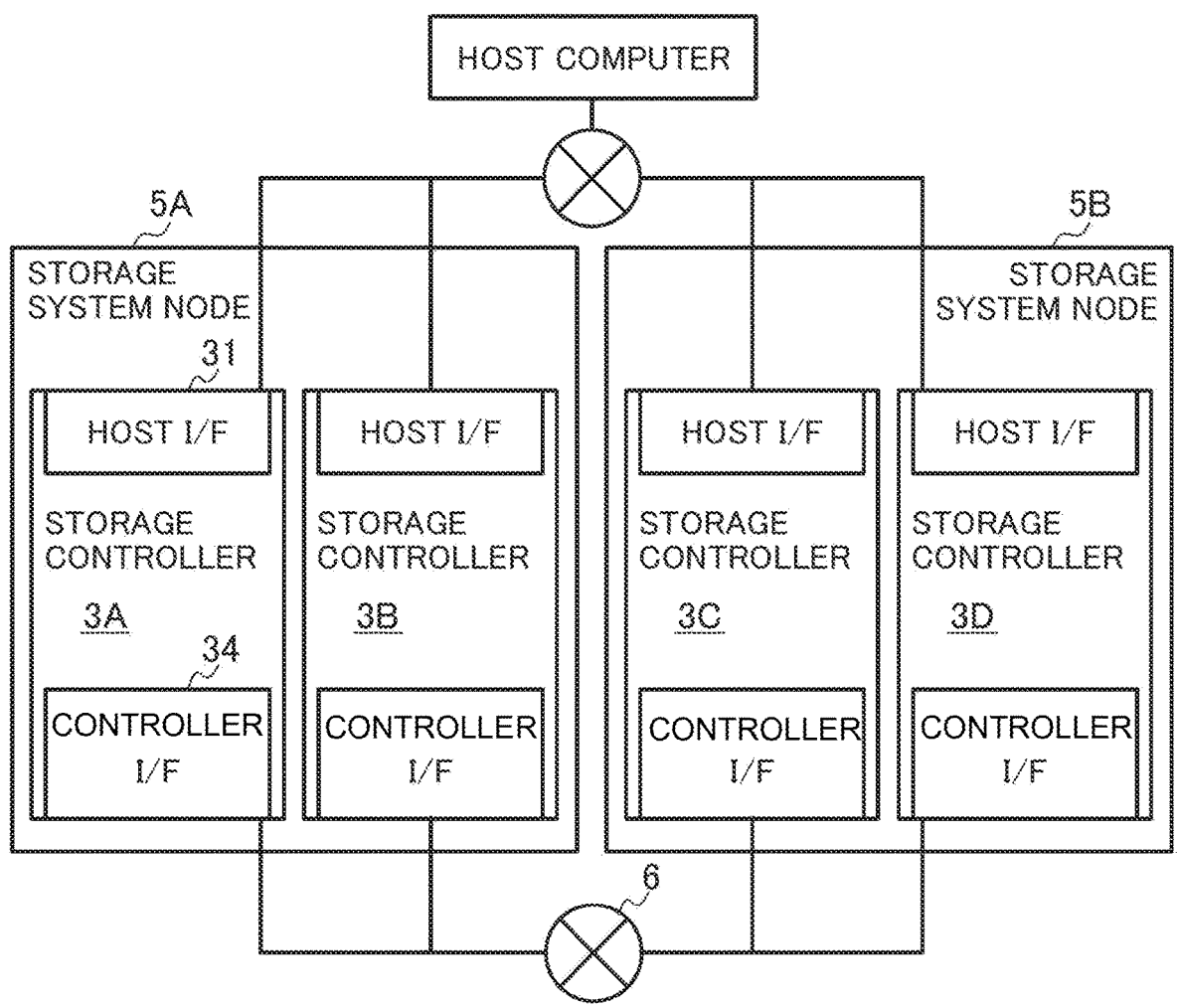
FIG. 15 shows a configuration example of a multi-node storage system according to a second embodiment.

FIG. 15 shows a configuration example of a multi-node storage system. The configuration example of FIG. 15 includes a node 5A and a node 5B. The node 5A includes storage controllers 3A and 3B. The node 5B includes storage controllers 3C and 3D. In the present configuration example, a switch 6 connects between the storage controllers. Inter-node communication may be implemented by a method different from the switch 6. Since the configuration of the storage controller is similar to the configuration example shown in FIG. 1, the components other than a host I/F 31 and a controller I/F 34 are omitted.

Figure 16:
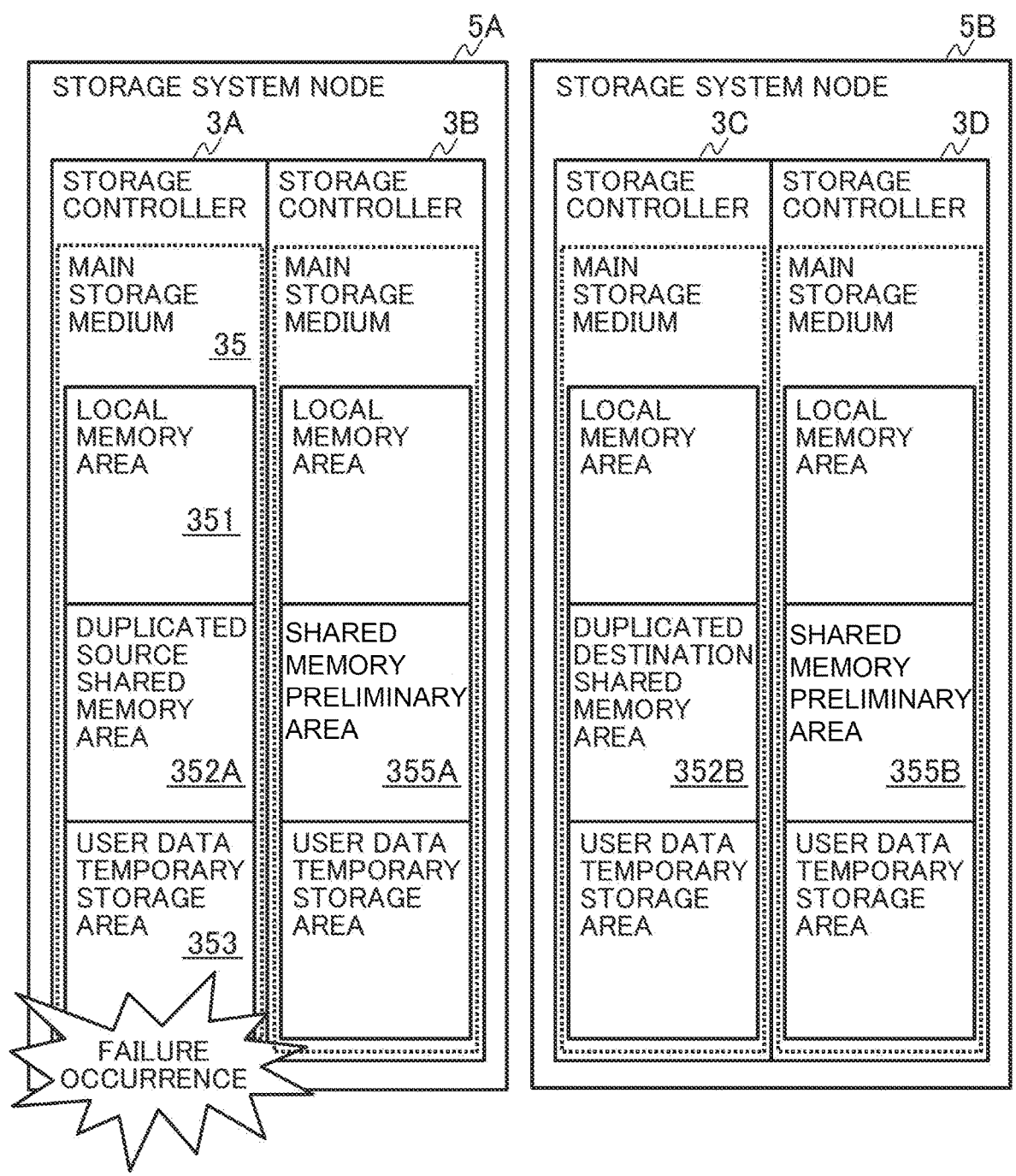
FIG. 16 shows a use example of main storage media in the multi-node storage system.

FIG. 16 shows areas 351 to 355B in main storage media 35 in the storage controllers of the multi-node storage system. In the present example, the two storage controllers 3A and 3C different in node respectively include a duplicated source shared memory area 352A and a duplicated destination shared memory area 352B. Data of the duplicated source shared memory area 352A and the duplicated destination shared memory area 352B are duplicated.

The non-duplicated storage controllers 3B and 3D respectively include shared memory preliminary areas 355A and 355B. The storage controllers including the duplicated source shared memory area 352A, the duplicated destination shared memory area 352B, the shared memory preliminary area 355A, and the shared memory preliminary area 355B are not limited to the example of FIG. 16. The number of the shared memory preliminary areas may be larger or smaller.

Figure 17:
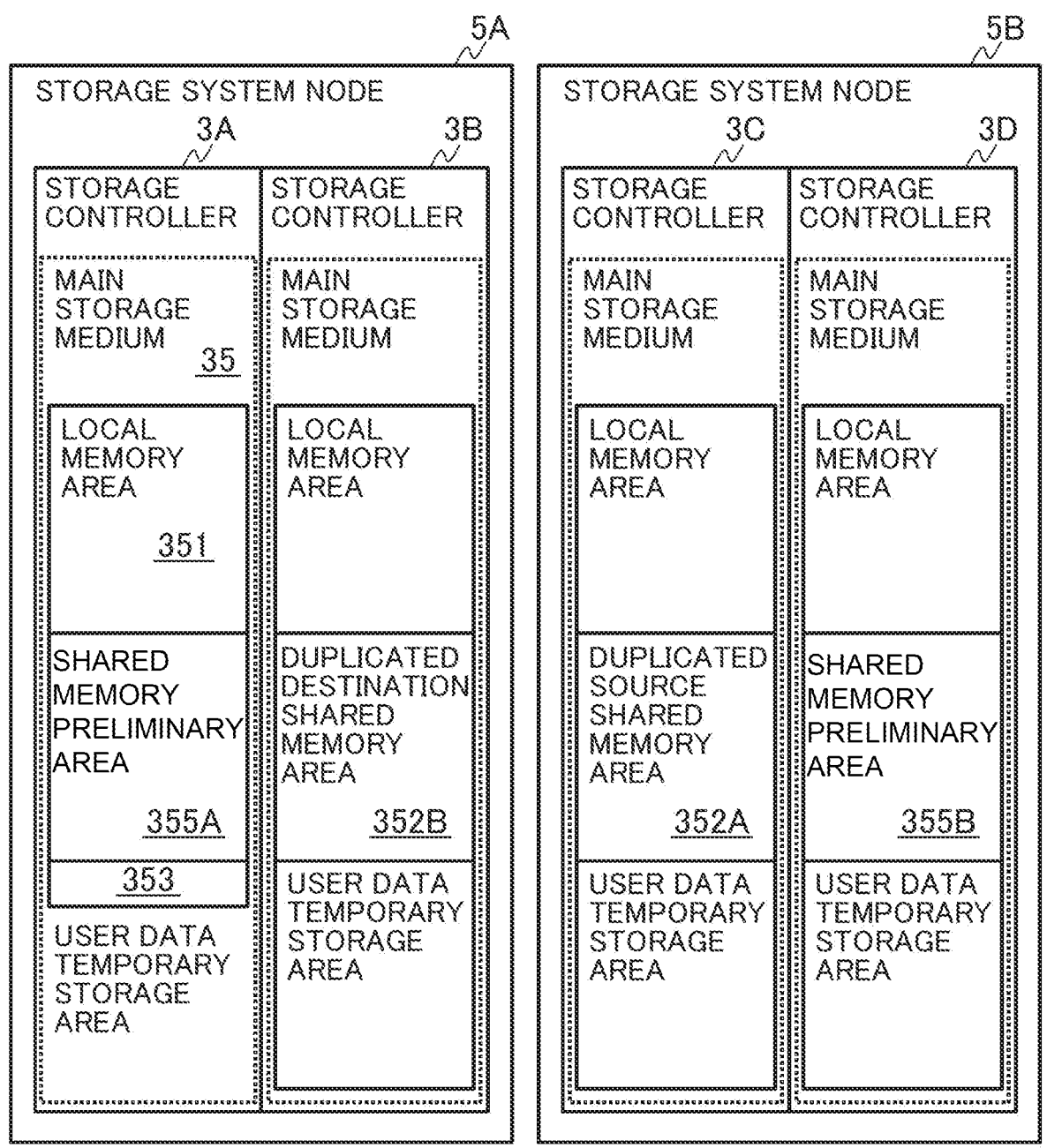
FIG. 17 shows a use example of the main storage media in the multi-node storage system after a failure has occurred.

A description will be made below as to an example where a failure has occurred in the main storage medium 35 of the storage controller 3A including the duplicated source shared memory area 352A. FIG. 17 shows an example of allocation of the areas 351 to 355B in the main storage media 35 after the failure has occurred in the main storage medium 35 of the storage controller 3A.

When the failure has occurred in the main storage medium of the controller 3A, the duplicated destination shared memory area 352B of the storage controller 3C is changed to the duplicated source shared memory area 352A. In order to reconfigure duplication of the shared memory area, data is duplicated to the area taken as the shared memory preliminary area 355A of the storage controller 3B to provide the duplicated destination shared memory area 352B. It is thus possible to suppress degradation of the reliability due to the failure of the main storage medium. Afterwards, the restarted storage controller 3A holds the shared memory preliminary area 355A. At this time, the user data temporary storage area 353 is reduced.

Incidentally, the present invention is not limited to the above-described embodiments and includes various modifications. For example, the above-described embodiments have been described in detail to describe the present invention in an easy to understand manner, and are not necessarily limited to those having all configurations described here. Also, a part of the configuration of one embodiment can be replaced with the configuration of another embodiment. Further, the configuration of another embodiment can also be added to the configuration of one embodiment. Moreover, addition, deletion and replacement of another configuration can be performed to the part of the configuration of each embodiment.

Further, the above respective configurations, functions and processing parts and the like may be executed in hardware by, for example, their design by an integrated circuit or the like in terms of parts or all thereof. In addition, the above respective configurations and functions and the like may be executed in software by allowing the processors to interpret and execute programs of executing their functions. Information of a program, a table, a file, etc. for executing each function can be placed in a memory, a recording device such as a hard disk, SSD (Solid State Drive) or the like, or a recording medium such as an IC card, an SD card or the like.

Moreover, there have been shown as control lines and information lines, those considered to be necessary in terms of description. All control lines and information lines are not necessarily shown on a product. Almost all configurations may actually be considered to be connected to each other.

What is claimed is:

1. A storage system, comprising:
a first storage controller including a plurality of main storage media and one or more processor cores; and
a second storage controller including a plurality of main storage media and one or more processor cores and performing communication with the first storage controller,
wherein storage areas of the main storage media of the first storage controller are allocated to an address map,
wherein in response to the occurrence of failures in one or more main storage media of the main storage media of the first storage controller, the first storage controller is restarted to reallocate the storage areas of the main storage media excluding the one or more main storage media having caused the failures to an address map that is reduced in size compared to before the occurrence of the failures, and
wherein the second storage controller continues operating during the restarting of the first storage controller,
wherein areas including a local memory area, a shared memory area, and a user data temporary storage area in the first storage controller are defined in the address map, and
wherein the areas are redefined in the address map at the time of the restarting of the first storage controller,
wherein upon the reallocation of the storage areas to the address map, the user data temporary storage area is reduced prioritized over reducing the shared memory area and the local memory area.

2. The storage system according to claim 1,
wherein the storage areas of the main storage media are interleaved for each storage controller and allocated to an address map, and
wherein the storage areas of the main storage media of the first and second storage controllers, excluding the one or more main storage media having caused the failures, are interleaved after the reallocation of the address map.

3. The storage system according to claim 1,
wherein the first storage controller and the second storage controller are capable of using the respective main storage media by using the address map,
wherein when the failure has occurred, the second storage controller stops access to the main storage media of the first storage controller, and
wherein after the restarting, the second storage controller enables access to the main storage media of the first storage controller by using the address map subjected to the reallocation.

4. The storage system according to claim 1,
wherein the address map defines the local memory area in the first storage controller,
wherein either the first storage controller or the second storage controller determines a bootable processor core number after the restarting of the first storage controller on the basis of sizes of the storage areas of the main storage media of the first storage controller reallocated to the address map, and
wherein either the first storage controller or the second storage controller determines the size of the local memory area after the restarting of the first storage controller on the basis of the bootable processor core number after the restarting of the first storage controller.

5. The storage system according to claim 4,
wherein before restarting of the first storage controller, the address map defines the user data temporary storage area, and
wherein when the amount of reductions in the storage areas of the main storage media of the first storage controller due to the failures in the one or more main storage media is larger than a prescribed reducible amount of the user data temporary storage area, the bootable processor core number after the restarting of the first storage controller is reduced from the bootable processor core number before the restarting of the first storage controller.

6. The storage system according to claim 4,
wherein the address map defines the shared memory area in the first storage controller, and
wherein the size of the shared memory area is fixed.

7. The storage system according to claim 4,
wherein when the bootable processor core number after the restarting of the first storage controller is smaller than a threshold value, the first storage controller is blocked.

8. The storage system according to claim 4,
wherein when the bootable processor core number after the restarting of the first storage controller is smaller than a threshold value, the first storage controller stops host I/O processing and continues sharing of information with the second storage controller.

9. The storage system according to claim 1, further comprising a third storage controller including a shared memory area,
wherein before the occurrence of the failure, the first storage controller includes a shared memory area,
wherein the second storage controller includes a shared memory preliminary area,
wherein after the occurrence of the failure, the first storage controller changes the shared memory area of the first storage controller to a shared memory preliminary area, and
wherein after the occurrence of the failure, the second storage controller changes the shared memory preliminary area of the second storage controller to a shared memory area.

10. A control method of a system including a first storage controller and a second storage controller, comprising the steps of:
allocating storage areas of a plurality of main storage media of the first storage controller to an address map;
allowing the system to restart the first storage controller in response to the occurrence of failures in one or more main storage media of the main storage media of the first storage controller to reallocate the storage areas of the main storage media excluding the one or more main storage media having caused the failures to an address map that is reduced in size compared to before the occurrence of the failures, and
allowing the system to continue an operation of the second storage controller during the restarting of the first storage controller,
wherein areas including a local memory area, a shared memory area, and a user data temporary storage area in the first storage controller are defined in the address map, and
wherein the areas are redefined in the address map at the time of the restarting of the first storage controller,
wherein upon the reallocation of the storage areas to the address map, the user data temporary storage area is reduced prioritized over reducing the shared memory area and the local memory area.

* * * * *